(12) United States Patent
Humburg

(10) Patent No.: US 10,119,731 B2
(45) Date of Patent: Nov. 6, 2018

(54) TEMPERATURE CONTROL UNIT, ESPECIALLY VEHICLE TEMPERATURE CONTROL UNIT

(71) Applicant: Eberspächer Climate Control Systems GmbH & Co. KG, Esslingen (DE)

(72) Inventor: Michael Humburg, Göppingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 169 days.

(21) Appl. No.: 15/175,539

(22) Filed: Jun. 7, 2016

(65) Prior Publication Data

US 2016/0356529 A1    Dec. 8, 2016

(30) Foreign Application Priority Data

Jun. 8, 2015  (DE) .......................... 10 2015 108 954

(51) Int. Cl.
*F25B 21/00*    (2006.01)

(52) U.S. Cl.
CPC ...... *F25B 21/00* (2013.01); *F25B 2321/0022* (2013.01); *Y02B 30/66* (2013.01)

(58) Field of Classification Search
CPC ... F25B 21/00; F25B 2321/0022; Y02B 30/66
USPC .......................................................... 62/3.1
See application file for complete search history.

(56) References Cited

U.S. PATENT DOCUMENTS

| 6,332,323 B1* | 12/2001 | Reid ..................... F25B 29/003 |
| | | 62/6 |
| 9,746,211 B2* | 8/2017 | Barclay ................. F25B 9/002 |
| 9,857,105 B1* | 1/2018 | Schroeder .............. F25B 21/00 |
| 9,857,106 B1* | 1/2018 | Schroeder .............. F25B 21/00 |
| 2002/0040583 A1* | 4/2002 | Barclay ................... F25J 1/001 |
| | | 62/3.1 |

(Continued)

FOREIGN PATENT DOCUMENTS

| DE | 60 2004 006025 T2 | 12/2007 |
| DE | 60 2004 007 299 T2 | 2/2008 |

(Continued)

*Primary Examiner* — Kun Kai Ma
(74) *Attorney, Agent, or Firm* — McGlew and Tuttle, P.C.

(57) ABSTRACT

A temperature control unit includes a temperature control body made of magnetocaloric material and elongated in a longitudinal direction (L), through which or/and around which heat transfer medium can flow. A magnetic field arrangement (16) has magnetic field heating areas (22) arranged following one another in a shifting direction (V) and cooling areas (24) between the magnetic field heating areas (22). A plurality of heat transfer medium flow zones ($Z_i$) following one another in the longitudinal direction (L) are provided with the temperature control body (14). At least two heat transfer medium flow zones ($Z_i$) adjacent to one another in the longitudinal direction (L) of the temperature control body provide a heat transfer medium circulation sector (I, II, III, IV). Heat input fluid, flowing relative to heat transfer medium flow zones ($Z_1$), feed heat in and heat discharge fluid flowing relative to heat transfer medium flow zones ($Z_8$) discharging heat.

20 Claims, 3 Drawing Sheets

(56) References Cited

U.S. PATENT DOCUMENTS

| | | | |
|---|---|---|---|
| 2004/0182086 A1* | 9/2004 | Chiang | F25B 21/00 62/3.1 |
| 2005/0091974 A1* | 5/2005 | Carnahan | F02G 1/0435 60/517 |
| 2007/0125095 A1* | 6/2007 | Iwasaki | F25B 21/00 62/3.1 |
| 2007/0199332 A1* | 8/2007 | Muller | F28D 9/0075 62/3.1 |
| 2009/0266083 A1* | 10/2009 | Shin | F25B 21/00 62/3.1 |
| 2011/0192834 A1* | 8/2011 | Muller | F25B 21/00 219/618 |
| 2012/0031108 A1* | 2/2012 | Kobayashi | F25B 21/00 62/3.1 |
| 2013/0019610 A1* | 1/2013 | Zimm | F25B 21/00 62/3.1 |
| 2013/0042632 A1* | 2/2013 | Muller | F25B 21/00 62/3.1 |
| 2013/0199754 A1* | 8/2013 | Kuo | F25B 21/00 165/104.11 |
| 2013/0227965 A1* | 9/2013 | Yagi | F25B 21/00 62/3.1 |
| 2013/0255279 A1* | 10/2013 | Tomimatsu | F25B 21/00 62/3.1 |
| 2014/0130515 A1* | 5/2014 | Tomimatsu | F25B 21/00 62/3.1 |
| 2018/0023862 A1* | 1/2018 | Schroeder | F25D 17/02 |

FOREIGN PATENT DOCUMENTS

| | | |
|---|---|---|
| EP | 2 645 015 A2 | 10/2013 |
| EP | 2 706 309 A1 | 3/2014 |
| WO | 2014/034374 A1 | 3/2014 |

* cited by examiner

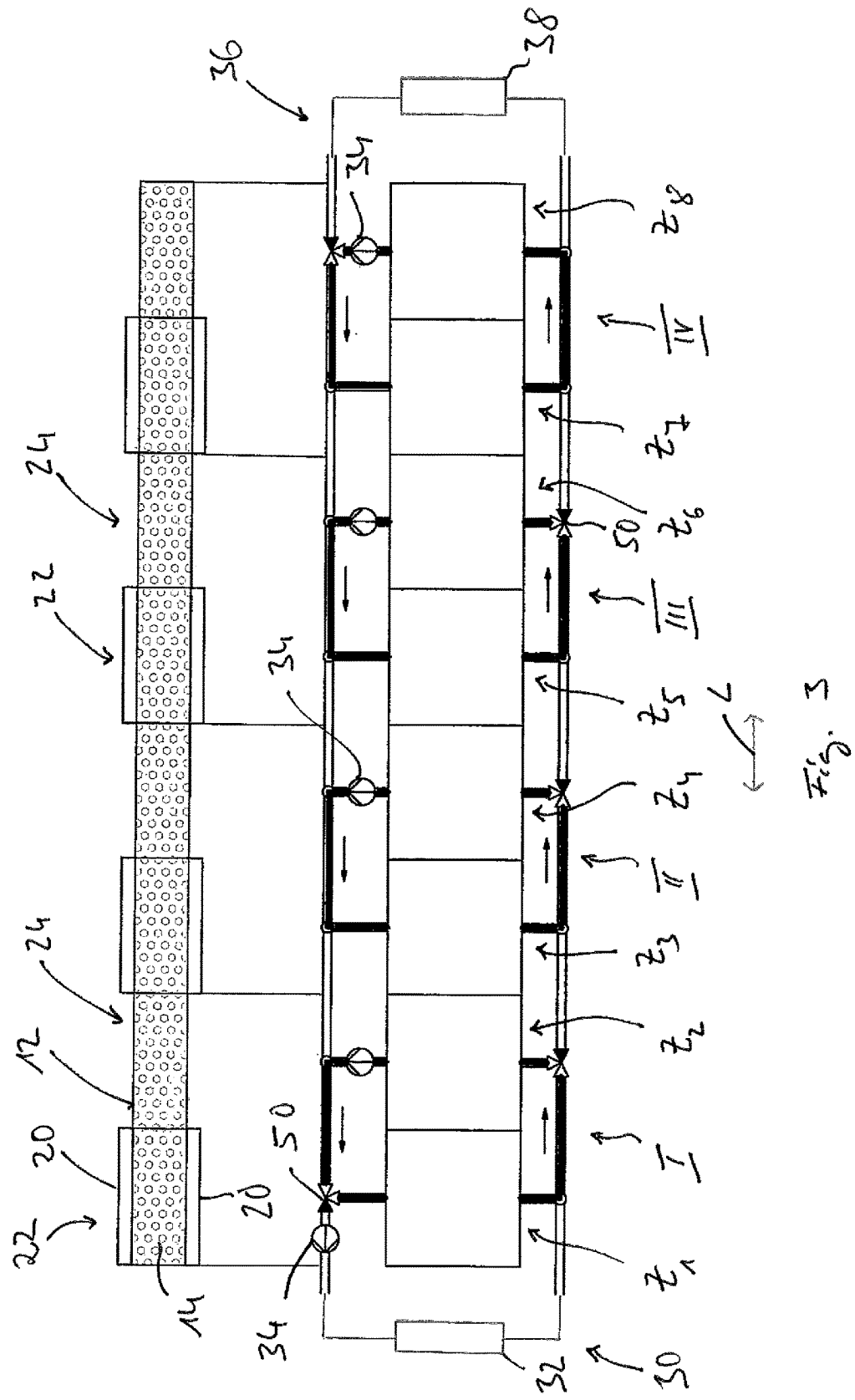

TEMPERATURE CONTROL UNIT, ESPECIALLY VEHICLE TEMPERATURE CONTROL UNIT

CROSS REFERENCE TO RELATED APPLICATIONS

This application claims the benefit of priority under 35 U.S.C. § 119 of German Application 10 2015 108 954.8 filed Jun. 8, 2015, the entire contents of which are incorporated herein by reference.

FIELD OF THE INVENTION

The present invention pertains to a temperature control unit, especially a vehicle temperature control unit, which can be used for cooling or heating, for example, a vehicle interior space by utilizing the magnetocaloric effect.

BACKGROUND OF THE INVENTION

Magnetocaloric material is alternately moved into a magnetic field and out of the magnetic field in heat pumps that operate by utilizing the magnetocaloric effect. A spin alignment of the electrons of the magnetocaloric material takes place under the influence of the magnetic field during the moving into the magnetic field. This spin alignment or alignment of the magnetic moments in the magnetic field results in the magnetic entropy decreasing. Because the overall entropy of the system cannot decrease, a thermal entropy manifesting itself in a rise in temperature is increased. The reverse process takes place if the magnetocaloric material is moved out of the magnetic field. The temperature of a magnetocaloric material moved out of a magnetic field decreases.

Because only minor differences in temperature can be brought about by utilizing the magnetocaloric effect compared to thermodynamic processes used in conventional cooling devices or heat pumps, it is necessary to carry out multistage processes, in which a successive temperature change is obtained by means of connecting in series a plurality of systems using the magnetocaloric effect, for providing a temperature change of the magnetocaloric material exceeding these temperature differences or of a fluid absorbing heat from said magnetocaloric material.

SUMMARY OF THE INVENTION

An object of the present invention is to provide a temperature control unit operating by utilizing the magnetocaloric effect, especially a vehicle temperature control unit, which can be operated with a simple and compact design for obtaining greater temperature changes.

According to the invention, a temperature control unit, especially a vehicle temperature control unit, is provided comprising:
  at least one temperature control body, which is elongated in a longitudinal direction of the temperature control body, which is made of magnetocaloric material and through which or/and around which heat transfer medium can flow,
  a magnetic field arrangement with magnetic field heating areas which are arranged following one another in a shifting direction and cooling areas between the magnetic field heating areas, wherein a plurality of heat transfer medium flow zones following one another in the longitudinal direction of the temperature control body are provided with the temperature control body, and at least two heat transfer medium flow zones adjacent to one another in the longitudinal direction of the temperature control body provide a heat transfer medium circulation sector, and wherein heat input fluid can flow through or/and around at least one heat transfer medium flow zone for feeding heat into this heat transfer medium flow zone, or/and wherein heat discharge fluid can flow through or/and around at least one heat transfer medium flow zone for discharging heat from this heat transfer medium flow zone.

The temperature control unit according to the present invention may operate, in the manner of a heat pump, by utilizing the magnetocaloric effect in order to cool the heat input fluid, on the one hand, and to heat the heat discharge fluid, on the other hand, by means of thermal interaction. Thus, heat is transferred from the heat input fluid to the heat discharge fluid. Depending on whether the temperature control unit according to the present invention shall be used as a heating device or as a cooling device, the heat input fluid may be used in an associated heat exchanger arrangement in order to cool another medium, for example, the air to be introduced into a vehicle interior space, or the heat discharge fluid may be used, for example, to heat the air to be introduced into a vehicle interior space. Because the efficiency of the temperature control unit according to the present invention increases with increasing temperature, especially of the heat input fluid, the use as a cooling device, i.e., for example, as a vehicle air conditioner, is particularly advantageous.

In order to achieve an adaptation of the position of the heat transfer medium circulation sectors to the positioning of the magnetic field arrangement in case the heat transfer medium flow zones follow one another in the direction of the longitudinal axis of the temperature control body, it is suggested that at least one heat transfer medium flow zone provide a heat transfer medium circulation sector together with a heat transfer medium flow zone adjacent to this heat transfer medium flow zone on a first side in the longitudinal direction of the temperature control body during a first phase of operation and provide a heat transfer medium circulation sector together with a heat transfer medium flow zone adjacent to this heat transfer medium flow zone on a second side in the longitudinal direction of the temperature control body during a second phase of operation.

In order to also integrate the heat transfer medium flow zones through which heat discharge fluid and heat input fluid can flow in this process of alternating switching, it is further suggested that in a type of phases of operation involving a first phase of operation and a second phase of operation, heat discharge fluid can flow through the at least one heat transfer medium flow zone through which heat discharge fluid can flow and heat input fluid can flow through the at least one heat transfer medium flow zone through which heat input fluid can flow, and that in the other type of phases of operation involving a first phase of operation and a second phase of operation, the heat transfer medium flow zone through which heat discharge fluid can flow together with a heat transfer medium flow zone adjacent to this zone in the longitudinal direction of the temperature control body provides a heat transfer medium circulation sector and the heat transfer medium flow zone through which heat input fluid can flow together with a heat transfer medium flow zone adjacent to this zone in the longitudinal direction of the temperature control body provides a heat transfer medium circulation sector.

First phases of operation and second phases of operation advantageously alternate with each other. A multistage temperature control operation with corresponding gradual temperature change is achieved.

The longitudinal direction of the temperature control body advantageously essentially corresponds to the shifting direction, i.e., that direction, along which a relative shifting motion, i.e., essentially a relative linear motion, is generated between the magnetic field arrangement and the temperature control body.

In order to be able to bring about a gradual temperature change in a simple manner, it is suggested that a circulation of heat transfer medium be provided in at least one heat transfer medium circulation sector, wherein during the circulation heat transfer medium is removed from one of the heat transfer medium flow zones of this heat transfer medium circulation sector and fed into the other heat transfer medium flow zone of this heat transfer medium circulation sector and heat transfer medium is removed from the other heat transfer medium flow zone and fed into the one heat transfer medium flow zone. In this connection, a compact design can be achieved for taking into consideration the relative shifting motion between the magnetic field arrangement and the temperature control body when the heat transfer medium is removed from the one heat transfer medium flow zone on a side of the temperature control body located essentially at right angles to the longitudinal direction of the temperature control body and is fed into the other heat transfer medium flow zone on the same side and is removed from the other heat transfer medium flow zone on another side located essentially at rights angles to the longitudinal direction of the temperature control body and is fed into the one heat transfer medium flow zone on the same side. In particular, provisions may be made in this case that in at least one heat transfer medium circulation sector, at least one heat transfer medium line leads from the one heat transfer medium flow zone to the other heat transfer medium flow zone and at least one heat transfer medium line leads from the other heat transfer medium flow zone to the one heat transfer medium flow zone.

For adaptation of the position of the heat transfer medium circulation sectors to the position of the magnetic field of the magnetic field arrangement, it is suggested that in at least one heat transfer medium flow zone, a line section of a heat transfer medium line leading from or to this zone can be connected to a line section of a heat transfer medium line leading from or to a heat transfer medium flow zone adjacent to this heat transfer medium flow zone on the first side in the longitudinal direction of the temperature control body or can be connected to a line section of a heat transfer medium line leading from or to a heat transfer medium flow zone adjacent to this heat transfer medium flow zone on the second side in the longitudinal direction of the temperature control body.

In particular, provisions may be made in this case for the line section of a heat transfer medium line leading from or to the at least one heat transfer medium flow zone to be connected to the line section of a heat transfer medium line leading from or to the heat transfer medium flow zone adjacent to this heat transfer medium flow zone on the first side in the longitudinal direction of the temperature control body during a first phase of operation and to be connected to the line section of a heat transfer medium line leading from or to the heat transfer medium flow zone adjacent to this heat transfer medium flow zone on the second side in the longitudinal direction of the temperature control body during a second phase of operation.

A switchability between these different flow states or flow connections can be achieved, for example, by the line sections being able to be connected by means of a switchable valve.

Further, provisions may be made for a heat transfer medium pump to be associated with at least one, preferably with each, heat transfer medium circulation sector for providing the circulation of heat transfer medium through the different heat transfer medium circulation sectors.

The number of heat transfer medium pumps needed for providing the circulation may be kept low according to an advantageous aspect by a heat transfer medium pump being provided in association with every other of the heat transfer medium flow zones following one another in the longitudinal direction of the temperature control body such that these heat transfer medium flow zones together with the heat transfer medium flow zones adjacent to these zones in the longitudinal direction of the temperature control body on the first side provide each a heat transfer medium circulation sector in a first phase of operation and together with the heat transfer medium flow zones adjacent to these zones in the longitudinal direction of the temperature control body on the second side provide each a heat transfer medium circulation sector in a second phase of operation.

In the configuration of the temperature control body according to the present invention, extending essentially in a straight line in the direction of the longitudinal direction of the temperature control body, a plurality of heat transfer medium circulation sectors are advantageously provided following one another in the longitudinal direction of the temperature control body for carrying out a multistage temperature control process.

In order to guarantee an ability to flow through the temperature control body permitting a suitable interaction with the temperature control body, it is suggested that this temperature control body is received in a temperature control body housing. Leaks of heat transfer medium from the area of the temperature control unit can thus also be avoided.

For providing an efficient interaction of the magnetic field generated by the magnetic field arrangement with the temperature control body, it is suggested that the magnetic field arrangement on at least one side essentially at right angles to the longitudinal direction of the temperature control body comprise a plurality of magnets, preferably permanent magnets, which are arranged spaced apart from one another and following one another in the longitudinal direction of the temperature control body and which provide essentially the magnetic field heating areas, the cooling areas being provided between magnets arranged spaced apart from one another in the longitudinal direction of the temperature control body. In this connection, magnets following one another in the longitudinal direction of the temperature control body are carried on a magnet carrier which can be driven by a drive for linear motion in the shifting direction.

In an especially advantageous configuration, it is suggested that a plurality of magnets following one another in the longitudinal direction of the temperature control body and arranged spaced apart from one another be provided each on both sides of the temperature control body essentially at right angles to the longitudinal direction of the temperature control body, and one magnet on the other side is located opposite at least one, preferably each, magnet on one side.

In order to be able to feed or discharge heat, taking the elongated configuration of the temperature control unit according to the present invention for carrying out the multistage temperature control process into consideration, it is further suggested that the heat transfer medium flow zone through which or/and around which heat input fluid can flow is provided on a longitudinal end area of the temperature control body and the heat transfer medium flow zone through which or/and around which heat discharge fluid can flow is provided on the other longitudinal end area of the temperature control body.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a diagram corresponding to FIG. 2, in which the temperature control unit is in a second phase of operation.

DESCRIPTION OF THE PREFERRED EMBODIMENTS

Figure 1:
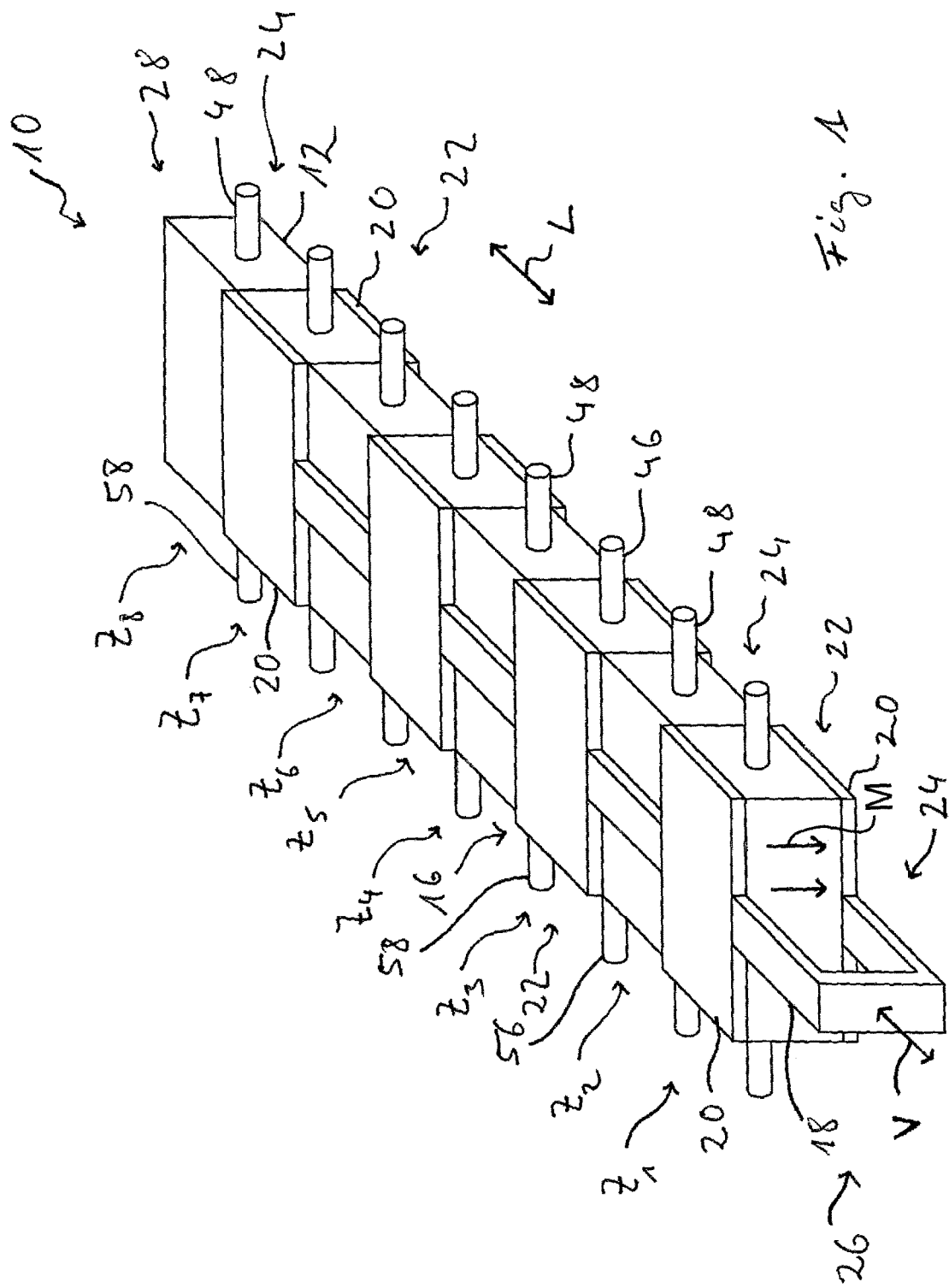
FIG. 1 is a schematic perspective view of a temperature control unit utilizing the magnetocaloric effect.

Referring to the drawings, FIG. 1 shows in a perspective view a temperature control unit, which is generally designated by 10, by means of which heat can be transferred in a multistage process utilizing the magnetocaloric effect. The temperature control unit 10 comprises a temperature control body 14 made of magnetocaloric material received in a temperature control body housing 12. The temperature control body housing 12 and the temperature control body 14 arranged in it are elongated in the direction of a longitudinal axis L of the temperature control body. In this connection, a plurality of heat transfer medium flow zones $Z_1$, $Z_2$, $Z_3$, $Z_4$, $Z_5$, $Z_6$, $Z_7$, and $Z_8$ following one another in the longitudinal direction L of the temperature control body, generally referred to as $Z_i$ below, is formed. For each of these heat transfer medium flow zones $Z_i$, the temperature control body 14 can be configured with a temperature control body segment provided in a sealed interior space area of the temperature control body housing 12, and the temperature control body segments associated with various heat transfer medium flow zones $Z_i$ can be separated from each other by means of corresponding wall areas of the temperature control body housing 12. In principle, however, a continuous block of material of the temperature control body 14 may extend through all or some of the heat transfer medium flow zones $Z_i$ as well.

Further, a magnetic field arrangement, which is generally designated by 16, can be seen in FIG. 1. This magnetic field arrangement comprises a plurality of permanent magnets 20 following one another in the shifting direction V or in the longitudinal direction L of the temperature control body on a magnet carrier 18. The magnet carrier 18 can be essentially shifted linearly in a shifting direction V by means of a moving drive, for example, an electric motor drive. In this case, a first group of these magnets 20 is arranged on one side essentially at right angles to the longitudinal axis L of the temperature control body, the side of the temperature control body 14 lying at the top in FIG. 1. A second group of permanent magnets 20 is arranged on the other, opposite side, which is oriented essentially at right angles to the longitudinal axis L of the temperature control body, such that permanent magnets 20 with different polarities are facing one another and are located opposite one another in pairs, receiving the temperature control body 14 between them. A magnetic field M is formed between these permanent magnets 20 located opposite one another in pairs. Each pair of such permanent magnets 20 located opposite one another forms a magnetic field heating area 22. A cooling area 24 each formed by an intermediate space between two magnetic field heating areas lies between two magnetic field heating areas following one another in the longitudinal direction L of the temperature control body.

By shifting the magnet carrier 18 in the shifting direction V, it becomes possible to shift the magnetic field heating areas such that they are alternately aligned each with one of two directly adjacent heat transfer medium flow zones. For example, in the position shown in FIG. 1, the magnetic field heating area 22 that can be seen at the furthest on the bottom left is in alignment with the heat transfer medium flow zone $Z_1$, while the directly following cooling area 24 is in alignment with the directly following heat transfer medium flow zone $Z_2$. The magnetic field heating area 22, which is at first aligned with the heat transfer medium flow zone $Z_1$, is moved into the area of the heat transfer medium flow zone $Z_2$ during the shifting of the magnet carrier 18 in the view of FIG. 1 to the upper right. The cooling area 24 following this magnetic field heating area 22 is then aligned with the heat transfer medium flow zone $Z_3$. In this state then, a cooling area 24 preceding the magnetic field heating area 22 which can be seen on the bottom left in FIG. 1 is also in the area of the heat transfer medium flow zone $Z_1$.

Such an alternating aligning of the heat transfer medium flow zones $Z_i$ either with a magnetic field heating area 22 or a cooling area 24 and in this connection the alternating generation or utilization of a magnetocaloric effect in each of those heat transfer medium flow zones $Z_i$, which are aligned with a magnetic field heating area 22 in a corresponding phase of operation, during the shifting back and forth of the magnet carrier 18, can be utilized in a manner described below to transport heat between the two heat transfer medium flow zones $Z_1$ and $Z_8$ positioned in the longitudinal end areas 26, 28 of the temperature control body 14.

Figure 2:
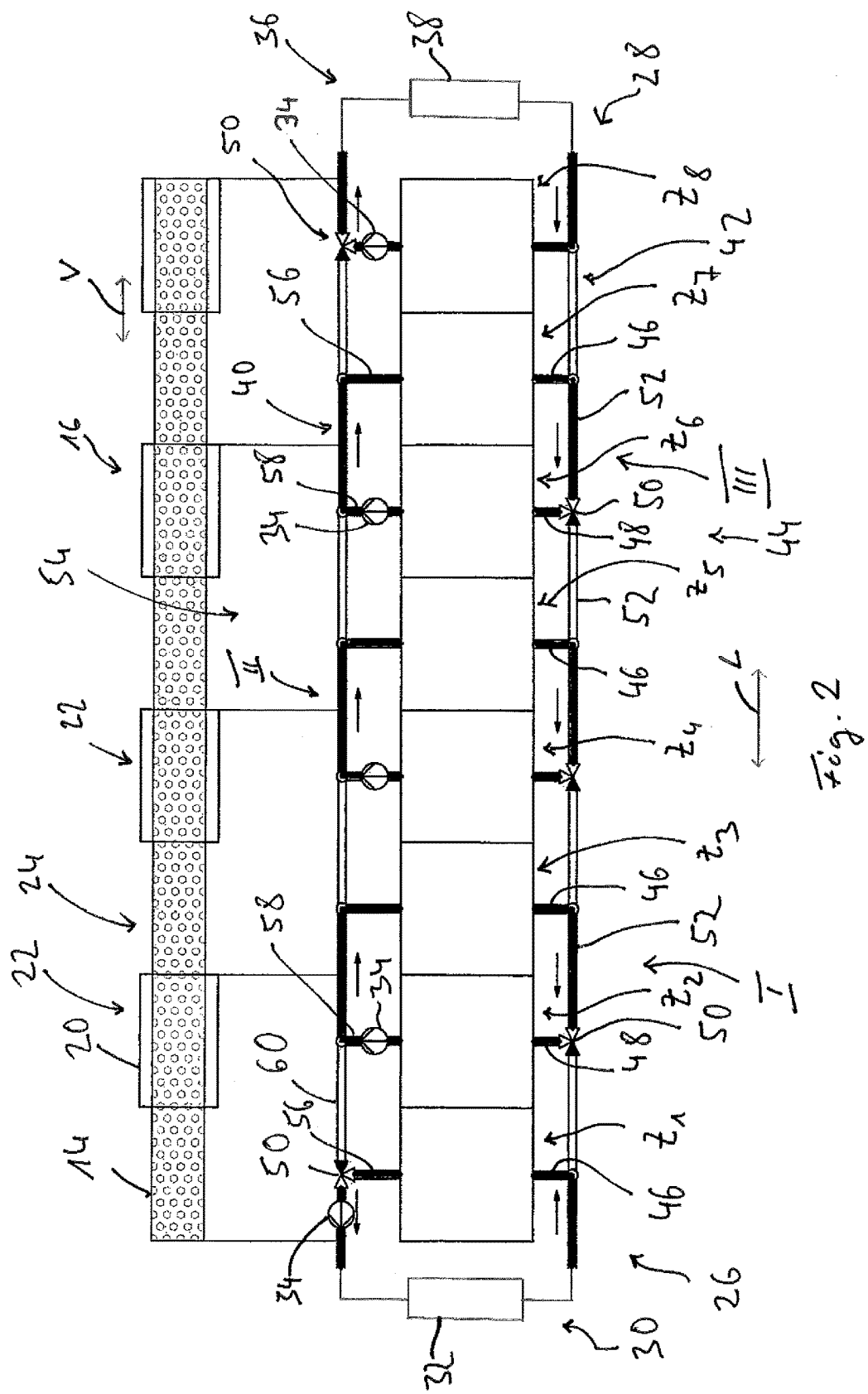
FIG. 2 is a schematic diagram of the temperature control unit for illustrating the heat transfer medium lines provided for providing position-variable heat transfer medium circulation sectors, the temperature control unit being in a first phase of operation.

It is seen in the diagram of FIG. 2 that the heat transfer medium flow zone $Z_1$ positioned there on the left is in flow connection with a closed circuit 30 for heat input fluid. This closed circuit 30 comprises a heat exchanger arrangement 32 as well as a pump 34. Correspondingly, in the phase of operation illustrated in FIG. 2, the heat transfer medium flow zone $Z_8$ is arranged in the other longitudinal end area 28 in connection with a closed circuit 36 for heat discharge fluid. This closed circuit 36 comprises a heat exchanger arrangement 38 as well as a pump 34.

Heat transfer medium flow zones $Z_i$ directly adjacent to one another in the longitudinal direction L of the temperature control body are connected to one another on their two sides located essentially at right angles to the longitudinal direction L of the temperature control body and at right angles to the direction of the magnetic field M by means of corresponding heat transfer medium lines 40, 42. This may be explained below on the basis of the heat transfer medium flow zones $Z_5$, $Z_6$ and $Z_7$.

On the side 44 of the temperature control body 14 or the temperature control body housing 12 shown at the bottom in FIG. 2, a line section 46 discharges into the temperature control body housing 12 in each case. A line section 48 discharges into the heat transfer medium flow zone $Z_6$ lying between them. This line section leads to a valve, e.g., a 3/2-way valve 50. The line sections 46 of the heat transfer medium flow zones $Z_5$ and $Z_7$ are likewise in connection with the 3/2-way valve 50 via line sections 52.

Corresponding line sections 56 discharge into the temperature control body housing 12 in the area of the heat transfer medium flow zone $Z_5$ and $Z_7$ on the side 54 shown at the top in FIG. 2. A line section 58, in which a pump 34 is arranged, discharges into the area of the heat transfer medium flow zone $Z_6$. The line sections 56 of the heat transfer medium flow zones $Z_5$ and $Z_7$ are in connection with the line section 58 via line sections 60.

Thus, a line section 46, a line section 52 and a line section 48 form a heat transfer medium line 42 on the side 44 in each case, while a line section 56, a line section 60 and a line section 58 provide a heat transfer medium line 40 on the side 54 in each case.

In the area of the heat transfer medium flow zones $Z_1$ and $Z_8$ lying in the longitudinal end areas 26, 28, a structural change is present to the extent that in the heat transfer medium flow zone $Z_1$, the line section on the side 54 is connected or can be connected to the line section 60 via a 3/2-way valve 50, on the one hand, and to the closed circuit 30, on the other hand. In the area of the heat transfer medium flow zone $Z_8$, the line section 58 containing the pump 34 is connected to the line section 60 and the closed circuit 36 via a 3/2-way valve 50.

The operation of the temperature control unit 10 for transporting heat from the heat input fluid circulating in the closed circuit 30 to the heat discharge fluid circulating in the closed circuit 36 is described below with reference to FIGS. 2 and 3. In this case, it may be assumed, for example, that the air to be introduced into a vehicle interior space shall be cooled by means of the heat input fluid circulating in the closed circuit 30 and the heat exchanger arrangement 32, while heat shall be discharged outwards, i.e., into the surrounding area, in the area of the heat exchanger arrangement 38 of the closed circuit 36. It is obvious that the air to be introduced into a vehicle interior space can be heated in case of a correspondingly transposed arrangement or association of the heat exchanger arrangements 32, 38.

In the first phase of operation shown in FIG. 2, the two heat transfer medium flow zones $Z_1$ and $Z_8$ are each in flow connection with the closed circuits 30 and 36. A total of three heat transfer medium circulation sectors I, II and III are set up between these two heat transfer medium flow zones $Z_1$ and $Z_8$ through the heat transfer medium flow zones $Z_2$ through $Z_6$. For this, the 3/2-way valves, which are provided in association with the heat transfer medium flow zones $Z_2$, $Z_4$ and $Z_6$, are switched so that a circulation of the heat transfer medium, i.e., for example, water, which is guided through line sections (shaded), is brought about in each case by means of the delivery action of the pumps 34 also associated with these heat transfer medium flow zones. There is no flow connection between the heat transfer medium flow zones $Z_1$ and $Z_2$, $Z_3$ and $Z_4$, $Z_5$ and $Z_6$, as well as $Z_7$ and $Z_8$ in this case. For example, the heat transfer medium flow zone $Z_3$ with the heat transfer medium flow zone $Z_2$ lying adjacent to this zone on a first side in the longitudinal direction L of the temperature control body forms the heat transfer medium circulation sector I in this first phase of operation.

It is further seen that in the first phase of operation shown in FIG. 2 the permanent magnets 20 of the magnetic field arrangement 16 are positioned such that they lie in the area of the heat transfer medium flow zones $Z_2$, $Z_4$, $Z_6$ and $Z_8$. Induced by the magnetocaloric effect generated in these heat transfer medium flow zones $Z_2$, $Z_4$, $Z_6$ and $Z_8$, the temperature control body 14 is heated adiabatically in these areas. Heat is discharged there and transported to each of the directly adjacent heat transfer medium flow zones of the corresponding heat transfer medium circulation sector I, II, III, in which a corresponding cooling area 24 of the magnetic field arrangement 16 is positioned, due to the heat transfer medium circulating through these heat transfer medium flow zones with heated temperature control body 14. These are the heat transfer medium flow zones $Z_3$, $Z_5$ and $Z_7$. In the area of the heat transfer medium flow zone $Z_8$, in which the temperature control body 14 is likewise heated by the magnetocaloric effect in this first phase of operation, heat is discharged from the temperature control body 14 by means of the heat discharge fluid circulating in the closed circuit 36 and discharged, for example, into the ambient air in the area of the heat exchanger arrangement 38. In the area of the heat transfer medium flow zone $Z_1$, the heat input fluid circulates in the closed circuit 30 through an area of the temperature control body 14, which is not heated by the magnetocaloric effect, but rather is at a lower temperature level. As a result, the heat input fluid circulating in the closed circuit 30 is cooled and heat is fed to the area of the temperature control body 14 lying in the area of the heat transfer medium flow zone $Z_1$ or is cooled during this thermal interaction.

If the magnet carrier 18 is shifted into the position shown in FIG. 3 and also corresponding to the state of FIG. 1, then the magnetic field heating areas 22 are now moved out of the areas of the heat transfer medium flow zones $Z_2$, $Z_4$, $Z_6$ and $Z_8$ into the areas of the heat transfer medium flow zones $Z_1$, $Z_3$, $Z_5$ and $Z_7$. Associated with this shifting of the magnet carrier 18, the various 3/2-way valves 50 are switched such that a first heat transfer medium circulation I is now formed with the heat transfer medium flow zones $Z_1$ and $Z_2$, a second heat transfer medium circulation sector is formed with the heat transfer medium flow zones $Z_3$ and $Z_4$, a third heat transfer medium circulation sector is formed with the heat transfer medium flow zones $Z_5$ and $Z_6$ and a fourth heat transfer medium circulation sector IV is formed with the heat transfer medium flow zones $Z_7$ and $Z_8$ in a second phase of operation. In this second phase of operation, the heat transfer medium flow zone $Z_3$ together with the heat transfer medium flow zone $Z_4$ adjacent to this zone on a second side in the longitudinal direction L of the temperature control body now forms the heat transfer medium circulation sector II. The two closed circuits 30, 36 are disconnected in this second phase of operation.

Due to the motion of the permanent magnets 20 of the magnetic field heating areas 22 lined up with the heat transfer medium flow zones $Z_1$, $Z_3$, $Z_5$ and $Z_7$, a magnetocaloric effect will occur there and the temperature control body 14 is heated. The spin alignment generated by the magnetic interaction is lost in the heat transfer medium flow zones $Z_2$, $Z_4$, $Z_6$ and $Z_8$ now aligned with the cooling areas 24, which leads to a cooling of the temperature control body 14 in these areas. As a result, for example, in the heat transfer medium circulation sector I because of the temperature control body 14 heated in the heat transfer medium flow zone $Z_1$, the heat transfer medium circulating there is heated and heat is transferred to the section of the temperature control body 14 lying in the area of the heat transfer medium flow zone $Z_2$. Consequently, heat is extracted from the odd-numbered heat transfer medium flow zones $Z_i$ and heat is fed to the even-numbered heat transfer medium flow zones.

In a subsequent new passage into the first phase of operation shown in FIG. 2, the odd-numbered heat transfer medium flow zones $Z_i$ or the section of the temperature control body 14 positioned in them are cooled again by the moving of the magnetic field heating areas 22 away from the odd-numbered heat transfer medium flow zones $Z_i$, while heating will occur there or in the sections of the temperature control body 14 lying there due to the moving of the magnetic field heating areas 22 into the area of the even-numbered heat transfer medium flow zones $Z_i$. As a result, in a multistage process, heat is delivered from the area of the heat transfer medium flow zone $Z_1$ into the area of the heat transfer medium flow zone $Z_8$. The rise in temperature developing in each stage in this case is added up to a total rise in temperature such that the rise in temperature can be set or predefined by a corresponding increase in the number of stages between the heat transfer medium flow zones present in the heat transfer medium flow zones $Z_1$ and $Z_8$ lying in the longitudinal end areas 26, 28 and the heat transfer medium circulation sectors that can be generated therewith. The size and the geometry of the individual heat transfer medium flow zones may also be adapted for having an effect on the temperature variation. Further, it is obvious that a plurality of such units may operate in parallel in order to transport heat between the two closed circuits 30, 36.

In order to make it possible for the system to adapt in each case to the changed thermal conditions during the switching between the two phases of operation shown in FIGS. 2 and 3, this switching may occur intermittently. This means that after reaching, for example, the state shown in FIG. 2, the magnet carrier 18 first remains in this position and the heat transfer medium is delivered through the heat transfer medium circulation sectors and the closed circuits 30, 36. After a sufficient circulation time, the heat transfer medium circulation sectors I, II, III and IV set up in the second phase of operation are then activated for heat transport by means of corresponding actuation of the 3/2-way valves and movement of the magnet carrier 18 into the state shown in FIG. 3, and they remain activated for a predetermined duration before switching again into the state of FIG. 2.

Since the heat transfer medium flow zones $Z_i$ are also alternately each brought into flow connection with various other heat transfer flow zones $Z_i$ by means of switching the connections of the various heat transfer medium flow zones $Z_i$, preferably one and the same heat transfer medium, for example, water or another fluid suitable for the transport of heat in the intended temperature range is used for the entire system.

While specific embodiments of the invention have been shown and described in detail to illustrate the application of the principles of the invention, it will be understood that the invention may be embodied otherwise without departing from such principles.

What is claimed is:

1. A temperature control unit comprising:
   at least one temperature control body, which is elongated in a longitudinal direction of the at least one temperature control body and which is made of magnetocaloric material and through which or around which or both through which and around which heat transfer medium flows;
   a magnetic field arrangement comprising magnetic field heating areas which are arranged following one another in a shifting direction and cooling areas respectively between the following magnetic field heating areas; and
   a plurality of heat transfer medium flow zones provided with the at least one temperature control body following one another in the longitudinal direction of the at least one temperature control body, at least two of the plurality of heat transfer medium flow zones adjacent to one another in the longitudinal direction of the temperature control body providing at least one heat transfer medium circulation sector, wherein heat input fluid can flow through or around or both through and around at least one of the plurality of heat transfer medium flow zones for feeding heat into the at least one of the plurality of heat transfer medium flow zones, wherein heat discharge fluid can flow through or around or both through and around at least one of the plurality of heat transfer medium flow zones for discharging heat from the at least one of the plurality of heat transfer medium flow zones, wherein a circulation of the heat transfer medium is provided in the at least one heat transfer medium circulation sector, wherein during the circulation of the heat transfer medium, the heat transfer medium is removed from the at least one of the plurality of heat transfer medium flow zones of the heat transfer medium circulation sector and fed into another one of the plurality of heat transfer medium flow zones of the at least one heat transfer medium circulation sector and heat transfer medium is removed from the another one of the plurality of heat transfer medium flow zones and fed into the at least one of the plurality of heat transfer medium flow zones.

2. The temperature control unit in accordance with claim 1, wherein the plurality of heat transfer medium flow zones provide a heat transfer medium circulation sector together with the at least one of the plurality of heat transfer medium flow zones adjacent thereto on a first side, in the longitudinal direction of the temperature control body during a first phase of operation and provides another heat transfer medium circulation sector together with another one of the heat transfer medium flow zones adjacent to the at least one of the plurality of heat transfer medium flow zones on a second side in the longitudinal direction of the at least one temperature control body during a second phase of operation.

3. The temperature control unit in accordance with claim 2, wherein multiple phases of operation types are provided comprising:
   a first type of operation involving one of the first phase of operation and the second phase of operation with the heat discharge fluid flowing through the at least one of the plurality of heat transfer medium flow zones through which the heat discharge fluid can flow and heat input fluid can flow through the at least one of the plurality of heat transfer medium flow zones through which the heat input fluid can flow; and
   a second type of operation involving another one of the first phase of operation and the second phase of operation with the at least one of the plurality of heat transfer medium flow zones through which the heat discharge fluid can flow together with a heat transfer medium flow zone adjacent to the at least one of the plurality of heat transfer medium flow zones in the longitudinal direction of the at least one temperature control body providing one of the heat transfer medium circulation sectors and the at least one of the plurality of heat transfer medium flow zones through which the heat input fluid can flow together with a heat transfer medium flow zone adjacent to the at least one of the plurality of heat transfer medium flow zones in the longitudinal direction of the at least one temperature control body providing one of the heat transfer medium circulation sectors.

4. The temperature control unit in accordance with claim 2, wherein the first phases of operation and the second phases of operation alternate with one another.

5. The temperature control unit in accordance with claim 2, wherein the longitudinal direction of the at least one temperature control body essentially corresponds to the shifting direction.

6. The temperature control unit in accordance with claim 1, wherein the heat transfer medium is removed from the at least one of the plurality of heat transfer medium flow zones on a side located essentially at right angles to the longitudinal direction of the at least one temperature control body and is fed into the another one of the plurality of heat transfer medium flow zones on the same side and is removed from the another one of the heat transfer medium flow zones on another side located essentially at rights angles to the longitudinal direction of the at least one temperature control body and is fed into the at least one of the plurality of heat transfer medium flow zones on the same side.

7. The temperature control unit in accordance with claim 1, wherein in the at least one heat transfer medium circulation sector, at least one heat transfer medium line leads from the at least one of the plurality of heat transfer medium flow zones to the another one of the plurality of heat transfer medium flow zones and the at least one heat transfer medium line leads from the another one of the heat transfer medium flow zones to the at least one of the plurality of heat transfer medium flow zones.

8. The temperature control unit in accordance with claim 1, wherein in the at least one of the plurality of heat transfer medium flow zones, a line section of a heat transfer medium line leading from or to the at least one of the plurality of heat transfer medium flow zones can be connected to a line section of a heat transfer medium line leading from or to another one of the heat transfer medium flow zones adjacent to the at least one of the plurality of heat transfer medium flow zones on the first side in the longitudinal direction of the at least one temperature control body or can be connected to a line section of a heat transfer medium line leading from or to a heat transfer medium flow zone adjacent to the at least one of the plurality of heat transfer medium flow zones on the second side in the longitudinal direction of the at least one temperature control body.

9. The temperature control unit in accordance with claim 8, wherein the line section of a heat transfer medium line leading from or to the at least one heat transfer medium flow zone is connected to the line section of a heat transfer medium line leading from or to the heat transfer medium flow zone adjacent thereto on the first side in the longitudinal direction of the temperature control body during a first phase of operation and is connected to the line section of a heat transfer medium line leading from or to the heat transfer medium flow zone adjacent thereto on the second side in the longitudinal direction of the temperature control body during a second phase of operation.

10. The temperature control unit in accordance with claim 8, wherein line sections can be connected by means of a valve.

11. The temperature control unit in accordance with claim 1, further comprising a heat transfer medium pump associated with the at least one heat transfer medium circulation sector.

12. The temperature control unit in accordance with claim 2, further comprising a heat transfer medium pump associated with every other of the heat transfer medium flow zones following one another in the longitudinal direction of the at least one temperature control body such that the every other of the heat transfer medium flow zones together with the heat transfer medium flow zones adjacent to the every other of the heat transfer medium flow zones in the longitudinal direction of the at least one temperature control body on the first side each provide a heat transfer medium circulation sector in the first phase of operation and together with the heat transfer medium flow zones adjacent to the every other of the heat transfer medium flow zones in the longitudinal direction of the at least one temperature control body each provide a heat transfer medium circulation sector in the second phase of operation.

13. The temperature control unit in accordance with claim 1, wherein another heat transfer medium circulation sector is provided to provide a plurality of heat transfer medium circulation sectors, the plurality of heat transfer medium sectors being provided following one another in a longitudinal direction of the temperature control body.

14. The temperature control unit in accordance with claim 1, wherein the at least one temperature control body is received in a temperature control body housing.

15. The temperature control unit in accordance with claim 1, wherein the magnetic field arrangement on at least one side essentially at right angles to the longitudinal direction of the at least one temperature control body comprises a plurality of permanent magnets, which are arranged spaced apart from one another and following one another in the longitudinal direction of the at least one temperature control body and which provide essentially the magnetic field heating areas, the cooling areas being provided between magnets arranged spaced apart from one another in the longitudinal direction of the at least one temperature control body.

16. The temperature control unit in accordance with claim 15, wherein the magnetic field arrangement further comprises a magnet carrier and the plurality of permanent magnets following one another in the longitudinal direction of the at least one temperature control body are carried on the magnet carrier which is driveable by a drive for linear motion in the shifting direction.

17. The temperature control unit in accordance with claim 15, wherein the plurality of permanent magnets following one another in the longitudinal direction of the at least one temperature control body and arranged spaced apart from one another are provided each on both sides of the at least one temperature control body essentially at right angles to the longitudinal direction of the at least one temperature control body, one magnet on the other side being located opposite at least one, preferably each, magnet on one side.

18. The temperature control unit in accordance with claim 1, wherein the at least one of the plurality of heat transfer medium flow zones through which or around which or both through which and around which the heat input fluid can flow is provided on a longitudinal end area of the at least one temperature control body and the at least one of the plurality of heat transfer medium flow zones through which or around the heat discharge fluid can flow is provided on the other longitudinal end area of the temperature control body.

19. A vehicle temperature control unit comprising:
at least one temperature control body extending in a body longitudinal direction and comprising magnetocaloric material, the magnetocaloric material forming a heat transfer medium flow region around which or through which, or both through which and around which heat transfer medium flows;

a magnetic field arrangement comprising a plurality of spaced apart pairs of magnets following one another in a shifting direction, the plurality of spaced apart pairs of magnets forming a magnetic field therebetween for providing magnetic field heating areas and to form, in each space between two magnetic field heating areas, a cooling area with the heating areas and cooling areas following one another in the longitudinal direction of the temperature control body;

an electric motor drive connected to the magnetic field arrangement for linear motion of the magnetic field arrangement in the shifting direction; and a flow arrangement cooperating with the heat transfer medium flow region to establish a plurality of heat transfer medium flow zones following one another in the longitudinal direction of the temperature control body, wherein the flow arrangement comprises controllable valves for selectively establishing heat transfer medium circulation sectors with at least two heat transfer medium flow zones adjacent to one another in the longitudinal direction and heat input fluid passes through the heat transfer medium flow region for feeding heat into or for discharging heat from the plurality of heat transfer medium flow zones.

20. A temperature control unit comprising:

at least one temperature control body, which is elongated in a longitudinal direction of the at least one temperature control body and which is made of magnetocaloric material and through which or around which or both through which and around which heat transfer medium flows;

a magnetic field arrangement comprising magnetic field heating areas which are arranged following one another in a shifting direction and cooling areas respectively between the following magnetic field heating areas; and a plurality of heat transfer medium flow zones provided with the at least one temperature control body following one another in the longitudinal direction of the at least one temperature control body, at least two of the plurality of heat transfer medium flow zones adjacent to one another in the longitudinal direction of the temperature control body providing at least one heat transfer medium circulation sector, wherein heat input fluid can flow through or around or both through and around at least one of the plurality of heat transfer medium flow zones for feeding heat into the at least one of the plurality of heat transfer medium flow zones, wherein heat discharge fluid can flow through or around or both through and around at least one of the plurality of heat transfer medium flow zones for discharging heat from the at least one of the plurality of heat transfer medium flow zones, wherein the magnetic field arrangement on at least one side essentially at right angles to the longitudinal direction of the at least one temperature control body comprises a plurality of permanent magnets, which are arranged spaced apart from one another and following one another in the longitudinal direction of the at least one temperature control body and which provide essentially the magnetic field heating areas, the cooling areas being provided between magnets arranged spaced apart from one another in the longitudinal direction of the at least one temperature control body, wherein the plurality of permanent magnets following one another in the longitudinal direction of the at least one temperature control body and arranged spaced apart from one another are provided each on both sides of the at least one temperature control body essentially at right angles to the longitudinal direction of the at least one temperature control body, one magnet on the other side being located opposite at least one magnet on one side.

\* \* \* \* \*